United States Patent [19]

Edelstein et al.

[11] Patent Number: 4,687,048

[45] Date of Patent: Aug. 18, 1987

[54] MONOGROOVE COLD PLATE

[75] Inventors: Fred Edelstein, Hauppauge; Richard F. Brown, Bethpage, both of N.Y.

[73] Assignee: The United States of America as represented by the Administrator of the National Aeronautics and Space Administration, Washington, D.C.

[21] Appl. No.: 875,799

[22] Filed: Jun. 18, 1986

[51] Int. Cl.⁴ .............................................. F28D 15/00
[52] U.S. Cl. .......................................... 165/1; 165/13; 165/32; 165/104.25; 165/104.26; 165/41
[58] Field of Search ................... 165/40, 13, 1, 32, 96, 165/104.25, 104.26; 122/366; 126/423

[56] References Cited

U.S. PATENT DOCUMENTS 3,090,212  5/1963  Anderson et al. ............. 165/104.25
4,067,314  1/1978  Bollefer ................................. 165/13

FOREIGN PATENT DOCUMENTS 80088  5/1985  Japan ..................................... 165/13

Primary Examiner—Albert W. Davis, Jr.
Attorney, Agent, or Firm—Russell E. Schlorff; John R. Manning; Edward K. Fein

[57] ABSTRACT

The coolant fluid evaporated in a compact heat absorbing panel (12) utilizing monogroove heat pipes in a pumped two-phase system is replenished through a liquid inlet control valve (35) under the control of an ultrasonic liquid presence detector (40) which is connected to the panel (10). The detector (40) maintains the desired liquid quantity in the panel's liquid coolant channels (25), thereby dynamically responding to varying heat loads.

12 Claims, 3 Drawing Figures

MONOGROOVE COLD PLATE

ORIGIN OF THE INVENTION

The invention described herein was made in the performance of work under a NASA contract and is subject to the provisions of Section 305 of the National Aeronautics and Space Act of 1958, Public Law 85F568 (72 Stat. 435; 42 U.S.C. 2457).

BACKGROUND OF THE INVENTION

The present invention relates to heat pipes, and more particularly to a two-phase cold plate or heat absorbing panel constructed of an array of such heat pipes.

Two-phase cooling systems, particularly as embodied in heat pipes, have numerous advantages. Among these are near isothermality, very high heat transport capacity per unit of coolant moved (due to the phase change), low or zero energy required for coolant transport, and so forth. Disadvantages or conventional systems, however, have limited or prevented utilization in many circumstances. One such disadvantage is the relatively limited ability to transport meaningful coolant quantities over large distances. Another is the relatively limited ability to service many separate devices simultaneously, especially where the various thermal loads may be very different and/or significantly changing over time (e.g., equipment which is cycled on and off at various different times). As a result, single-phase cooling systems are still the system of choice in many configurations, such as the Space Shuttle, where two-phase loops could offer certain substantial advantages.

Pumped, two-phase heat-pipe style cooling loops (Thermal Bus) are currently being considered as candidates for overall thermal control of NASA's Space Station. As indicated, these systems transfer heat by evaporation and condensation rather than by sensible heat changes as in the conventional (e.g., Space Shuttle) single-phase cooling loops. Therefore, they operate at a substantially constant temperature over the entire length of the loop and are capable of transporting large thermal loads over long distances with relatively small pumping penalties. To be acceptable, however, such a system must perform independently of location. Also, specific heat exchangers ("sinks", or "cold plates") should be substantially isothermal, so that the temperature experienced by a piece of equipment which is mounted thereon will be substantially independent of its location on the plate. Also, the heat transfer between the equipment and the thermal bus fluid should occur with as low a temperature drop as possible, thus implying the need for high heat transfer coefficients. This is particularly important since the radiators represent the dominant weight of a space station's thermal control system. Finally, the plates should be able to transfer heat to the equipment so that it does not get too cold during periods when it is not operating. Thus, the system must be able to respond to substantially varying loads at a multiplicity of locations. At the same time, it should be uncomplicated, of minimum weight, reasonable cost, and high reliability.

Additionally, due to separate liquid and vapor lines, essentially no liquid should be allowed to exit the cold plates during normal operation. While some small amount of liquid is tolerable, larger amounts will lead to increased pressure drops in the vapor line caused by two-phase flow. Also, although the thermal bus is a mechanically pumped system, capillary forces distribute the coolant fluid in the heat pipe cold plate. Consequently, the plate performance in a gravity field may be somewhat lower than in 0-g. Thus, adequate heat flux capacity (e.g., $1W/cm^2$) should be provided in 1-g, to assure that 0-g performance will meet or exceed the system requirements. This implies a need to do more than merely control vapor pressure throughout the system, or furnish a constant coolant supply volume or pressure. It implies the need for active control of individual plate performance to assure a fully adequate supply of coolant therein, while also assuring that the plate is not flooded with too much.

A review of the prior art shows that heat pipe technology, of course, is well advanced. Monogroove heat pipes, in particular, are well developed and have many advantages for use in such a system. Also, the art includes many systems directed to means for controlling specific exchanger performance. It does not, however, appear to furnish the requirements just mentioned.

U.S. Pat. No. 4,515,207, issued May 7, 1985 (Alario et al.), for example, shows an excellent monogroove heat pipe with a bridging wick of spcific configuration. However, this patent does not disclose the use of active means for sensing the quantity of liquid in the liquid chamber and controlling a valve in response thereto.

U.S. Pat. No. 4,520,865, issued June 4, 1985 (Bizzell), U.S. Pat. No. 4,470,451, issued Sept. 11, 1984 (Alario et al.), and U.S. Pat. No. 4,422,501, issued Dec. 27, 1983 (Franklin et al.) show additional monogroove heat pipes.

U.S. Pat. No. 4,583,587, issued Apr. 22, 1986, shows a plurality of monogroove heat pipes welded together along their flanges.

U.S. Pat. No. 4,495,988, issued Jan. 29, 1985 (Grossman) discloses a means for sensing the vapor pressure in the vapor channel and then controls the pressure by means of a vapor pump.

U.S. Pat. Nos. 3,543,839, issued Dec. 1, 1970 (Shlosinger) 3,489,203, issued Jan. 13, 1970 (Fischell), and 3,414,050, issued Dec. 3, 1968 (Anand) disclose the use of valves in the vapor channel in order to control the heat conductivity of the pipes, in response to the temperature of the body whose temperature is being controlled by the heat pipes.

U.S. Pat. No. 4,308,912, issued Jan. 5, 1982 (Knecht) discloses the use of a valve in a solar heat collector for intermittently returning liquid from the condenser to the evaporator at periodic intervals.

U.S. Pat. Nos. 4,492,266, issued Jan. 8, 1985 (Bizzell et al.), 4,470,450, issued Sept. 11, 1984 (Bizzell et al.), 4,245,380, issued Jan. 20, 1981 (Maxson), 4,067,237, issued Jan. 10, 1978 (Arcella), 3,621,906, issued Nov. 23, 1971 (Leffert), and 3,517,730, issued June 30, 1970 (Wyatt) relate to heat pipes having various controlling means for altering the heat flow characteristics.

A need therefore remains for a two-phase cold plate having active control of individual plate performance to assure a fully adequate supply of coolant therein, while simultaneously assuring that the plate is not flooded with too much liquid. Further, such a plate must be able to respond to substantially varying loads at a multiplicity of locations. Additionally, it should be uncomplicated, of minimum weight, reasonable cost, and high reliability.

SUMMARY OF THE INVENTION

Briefly, the present invention meets the above needs and purposes with a two-phase cold plate having monogroove heat pipes which are replenished with coolant fluid through a control valve under the control of an ultrasonic liquid presence detector which detects and regulates the amount of liquid in the heat pipe. Thus, each cold plate is individually responsive to the loads placed upon it only.

More specifically, the preferred embodiment of the invention utilizes a separated two-phase loop. Liquid is pumped into a supply line which feeds individual cold plates or heat exchangers which remove heat from various associated modules or equipment. A control valve at the entrance to each plate admits the slightly pressurized liquid in response to a sensor that determines the amount of liquid remaining in the plate. Under load, liquid will evaporate in the plate until it is again refilled by the control valve, while at no load, liquid remains in the plate with the control valve closed. Essentially single-phase vapor exits the plate in response to the heat load. Vapor leaves the plate into the vapor collection and return line and is transported to a condenser where it is liquified and subcooled. Loop temperature control can be provided by flooding the condenser with excess liquid stored in a constant pressure accumulator. If desired, a regenerator can be used to reheat returning liquid under low load conditions. As discussed, the advantages of such a pumped, separated two-phase system are: (1) high evaporative heat transfer film coefficients at the heat sources, (2) ground testability with evaporators at different elevations, and (3) predictable vapor and liquid flow characteristics in 1-g and 0-g.

It is therefore an object of the present invention to provide an improved two-phase cold plate and method; such a cold plate having active control of individual plate performance to assure a fully adequate supply of coolant therein; which simultaneously assures that the plate is not flooded with too much liquid; which can respond to substantially varying loads at a multiplicity of locations; which includes at least one heat pipe; a liquid inlet means connected to the heat pipe for introducing liquid coolant into the liquid conducting channels of the heat pipe; gas outlet means connected to the heat pipe for removing coolant vapor from the vapor conducting channels of the heat pipe; valve means operatively connected to the liquid inlet means for regulating the amount of liquid coolant admitted into the cold plate through the liquid inlet means; liquid presence sensing means operatively connected to the cold plate for detecting the amount of liquid in the liquid conducting channels therein, and connected to the valve means for opening the valve means and admitting liquid coolant therethrough into the heat pipe upon detecting a quantity of liquid therein below a predetermined level; and to accomplish the above objects and purposes in an inexpensive, uncomplicated, light weight, durable, versatile, and reliable method and apparatus, inexpensive to manufacture, and readily suited to the widest possible utilization in heat transfer applications.

These and other objects and advantages of the invention will be apparent from the following description, the accompanying drawings, and the appended claims.

DESCRIPTION OF THE PREFERRED EMBODIMENT

Figure 1:
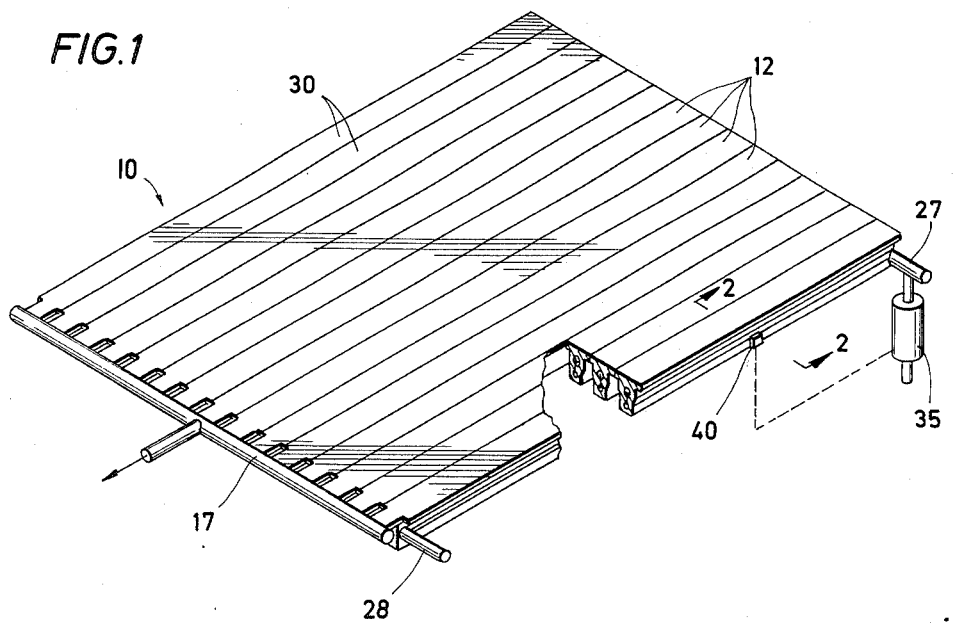
FIG. 1 is a somewhat figurative schematic illustration, partially broken away, showing a two-phase monogroove cold plate according to the present invention.

With reference to the drawings, the new and improved two-phase monogroove cold plate 10 and the method therefor according to the present invention, will be described. FIG. 1 depicts a schematic of the monogroove cold plate 10. It consists of a plurality of parallel sections of monogroove extrusion 12, welded together along their flanges to form the cold plate 10. The monogroove heat pipe sections 12 are fully described in U.S. Pat. No. 4,515,207 (mentioned above), the disclosure of which is incorporated herein by reference, and will therefore not be described in particular detail herein.

On one end of the cold plate assembly 10, the large diameter vapor channels 15 of the monogroove extrusions 12 are connected to a header or gas outlet plenum 17 which allows vapor to pass simultaneously out of the sections 12 and out of the cold plate 10.

On the opposite end of the cold plate 10, the small diameter liquid channels 25 of the monogroove extrusions 12 are connected to a liquid inlet header or plenum 27 which allows liquid to enter into the cold plate 10. Opposite plenum 27, a similar header or plenum 28 is connected to the other ends of each of the heat pipe liquid channels 25 to connect them together for fluid flow distribution between the monogroove elements. Plenum 28 thus helps to equalize the liquid distribution in the monogroove sections 12 and the liquid flow therethrough.

Heat input in the preferred embodiment occurs at the flanged surface 30 of plate 10 through direct mounting of equipment (not shown). The liquid channels 25 of the monogroove extrusions serve as a reservoir, which is fed by a solenoid valve 35 actuated by a single utlrasonic sensor 40. This is used to detect the presence of liquid in the reservoir. Whenever the reservoir is depleted to below a prescribed value, the sensor 40 signals the solenoid valve 35 to open, allowing liquid to refill the reservoir.

Figure 2:
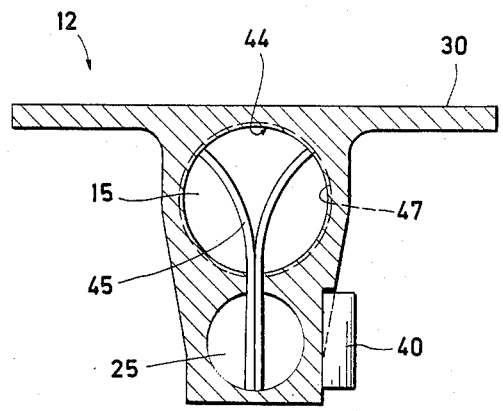
FIG. 2 is a cross-sectional view of a portion of the cold plate shown in FIG. 1, taken on line 2—2 thereof.

As described in the above-noted '207 patent, liquid is transferred from the reservoir channels 25 to the evaporating surface 44 located in the vapor channels 15, using a wick positioned between the two channels 15 and 25. As shown in FIG. 2, wick 45 is formed of two elements extending from liquid channel 25 to vapor channel 15, passing through the slot therebetween. Evaporation occurs from the fine circumferential grooves 47 (63 per cm) cut into the vapor channel 15. Since the cold plate 10 is operated as a flow-through device, as opposed to a closed heat pipe, vapor produced along the evaporating surface 44 is transferred into a single vapor plenum 17 at one end of the cold plate 10, where it is ultimately directed to a condenser (not shown) downstream in the thermal bus loop. Thus, the cold plate 10 operates effectively as a single evaporator.

Figure 3:
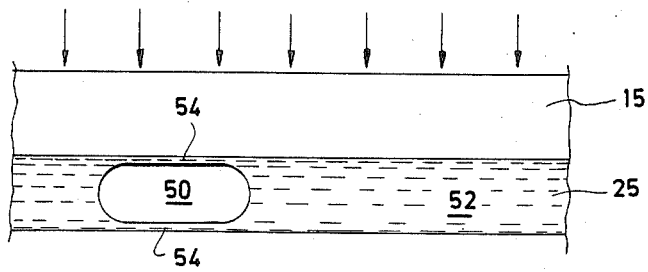
FIG. 3 is a schematic illustration showing maintenance of fluid flow in the liquid channel in the presence of a vapor bubble.

In 1-g, as liquid is depleted from the reservoir channels 25, the level will drop vertically. When the level drops below that of the ultrasonic sensor 40, the sensor will signal the valve 35 to open. In 0-g, however, the situation is different. As liquid is depleted, a vapor bubble 50 (FIG. 3) will form in the channel 25 at the location that has the largest radius of curvature. (By providing a hole in the portion of the wick 45 that extends into each liquid channel 25, the location of bubble formation can be controlled.) As liquid 52 is depleted, the vapor bubble 50 will grow, with liquid fillet flow 54 supporting the fluid needs of the wall grooves 47. The sensor 40 is preferably located some distance away from the zone where such bubbles may form (e.g., away from a suitably provided hole in the wick), with the distance being determined by the amount of flow that can be supported by fillet pumping. Also, in the preferred embodiment, to ensure adequate flow under conditions of partial load, the liquid channels may have a wick connection with each other (not shown) through the liquid plenums 27 and 28.

As may be seen, therefore, the present invention has numerous advantages. Principally, it provides a highly efficient and effective two-phase monogroove cold plate having excellent evaporative heat transfer, and reliable separation of the liquid and vapor phases at the inlet and outlet ports of the plate, thereby eliminating the complexities and uncertainties of two-phase flow in 0-g. In addition, because the valve 35 enables the use of a pressurized and individualized liquid supply, the individual plates can be operated according to their own heat load demands, even at extended distances on the loop, and independently of one another. The pressurized supply also facilitates ground testing in 1-g where there may be considerable height differences between different plates 10. And, while described at least in part with reference to space applications, it will also be readily apparent that the present invention has numerous important applications in a wide variety of fields, where efficient and reliable integrated heat pipe heat transport under widely varying load conditions at distributed locations may be required. Specific utility for use with radiators and solar energy panels will also be apparent.

While the methods and forms of apparatus herein described constitute preferred embodiments of this invention, it is to be understood that the invention is not limited to these precise methods and forms of apparatus, and that changes may be made therein without departing from the scope of the invention.

What is claimed is:

1. In a method for operating a two-phase cold plate, the plate including at least one heat pipe, said heat pipe having a large diameter vapor channel, a small diameter liquid channel, and a transfer groove interconnecting said vapor channel with said liquid channel, liquid inlet means connected to the heat pipe for introducing liquid coolant into the liquid conducting channels of the heat pipe, and gas outlet means connected to the heat pipe for removing coolant vapor from the vapor conducting channels of the heat pipe, the method comprising:
    (a) detecting the amount of liquid in the liquid conducting channels of the cold plate, and
    (b) admitting liquid coolant into the heat pipe upon detecting a quantity of liquid therein below a predetermined level.

2. The method of claim 1 further comprising a plurality of such heat pipes attached to one another.

3. The method of claim 2 wherein the heat pipes extend substantially parallel to one another.

4. The method of claim 2 further comprising simultaneously introducing coolant through a plenum into the liquid channels of each of the heat pipes.

5. The method of claim 4 further comprising equalizing the liquid distribution and liquid flow through the heat pipes by means of a second plenum connected to the other ends of each of the heat pipes.

6. The method of claim 2 further comprising simultaneously removing coolant vapor from the vapor channels through a plenum connected to all of the heat pipes.

7. The method of claim 1 further comprising sensing the presence of liquid with an ultrasonic sensor connected to the cold plate.

8. In a method for operating a two-phase monogroove cold plate, the plate including a plurality of monogroove heat pipes extending substantially parallel to and attached to one another, liquid inlet plenum means connected to the heat pipes for introducing liquid coolant simultaneously into the liquid conducting channels of the heat pipes, a second liquid plenum connected to the other ends of each of the heat pipes for connecting them together to help equalize the liquid distribution therein and liquid flow therethrough, and gas outlet plenum means connected to the heat pipes for removing coolant vapor simultaneously from the vapor conducting channels of the heat pipes, the method comprising:
    (a) with an ultrasonic liquid presence sensor means operatively connected to the cold plate, detecting the amount of liquid in the liquid conducting channels of the cold plate, and
    (b) admitting liquid coolant substantially intermittently into the heat pipe liquid inlet plenum upon detecting a quantity of liquid in the cold plate below a predetermined level.

9. A two-phase cold plate, comprising:
    (a) a plurality of monogroove heat pipes extending substantially parallel to and attached to one another, each heat pipe having a large diameter vapor channel and a small diameter liquid channel and a transfer groove interconnecting said vapor channel to said liquid channel,
    (b) liquid inlet plenum means connected to said heat pipes for introducing liquid coolant simultaneously into the liquid conducting channels of said heat pipes,
    (c) a second liquid plenum connected to the other ends of each of said heat pipes for connecting them together to help equalize the liquid distribution therein and liquid flow therethrough,
    (d) gas outlet plenum means connected to said heat pipes for removing coolant vapor simultaneously from the vapor channels of said heat pipes,
    (e) valve means operatively connected to said liquid inlet plenum means for regulating the amount of liquid coolant admitted into said cold plate through said liquid inlet means, and
    (f) liquid presence sensing means operatively connected to said cold plate for detecting the amount of liquid in said liquid conducting channels therein, and connected to said valve means for opening said valve means and admitting liquid coolant substantially intermittently therethrough into said heat pipes upon detecting a quantity of liquid therein below a predetermined level.

10. The cold plates of claim 9 further including a wick positioned in said groove.

11. The apparatus of claim 9 wherein said liquid presence sensing means further comprises an ultrasonic sensor connected to said cold plate.

12. A two-phase monogroove cold plate, comprising:
 (a) a plurality of monogroove heat pipes extending substantially parallel to and attached to one another,
 (b) liquid inlet plenum means connected to said heat pipes for introducing liquid coolant simultaneously into the liquid conducting channels of said heat pipes,
 (c) a second liquid plenum connected to the other ends of each of said heat pipes for connecting them together to help equalize the liquid distribution therein and liquid flow therethrough,
 (d) gas outlet plenum means connected to said heat pipes for removing coolant vapor simultaneously from the vapor channels of said heat pipes,
 (e) valve means operatively connected to said liquid inlet plenum means for regulating the amount of liquid coolant admitted into said cold plate through said liquid inlet means, and
 (f) an ultrasonic liquid presence sensor means operatively connected to said cold plate for detecting the amount of liquid in said liquid conducting channels therein, and connected to said valve means for opening said valve means and admitting liquid coolant substantially intermittently therethrough into said heat pipes upon detecting a quantity of liquid therein below a predetermined level.

* * * * *